US008655564B2

United States Patent
Breuer et al.

(10) Patent No.: US 8,655,564 B2
(45) Date of Patent: Feb. 18, 2014

(54) DRIVER ASSISTANCE SYSTEM FOR A MOTOR VEHICLE

(75) Inventors: Karsten Breuer, Lauenau (DE); Ruppert Kamping, Hannover (DE); Hartmut Kitterer, Neu-Ulm (DE)

(73) Assignee: WABCO GmbH, Hannover (DE)

( * ) Notice: Subject to any disclaimer, the term of this patent is extended or adjusted under 35 U.S.C. 154(b) by 693 days.

(21) Appl. No.: 12/734,064

(22) PCT Filed: Jul. 17, 2008

(86) PCT No.: PCT/EP2008/005819
§ 371 (c)(1),
(2), (4) Date: Jul. 22, 2010

(87) PCT Pub. No.: WO2009/049697
PCT Pub. Date: Apr. 23, 2009

(65) Prior Publication Data
US 2010/0318256 A1    Dec. 16, 2010

(30) Foreign Application Priority Data

Oct. 20, 2007   (DE) .................. 10 2007 050 221

(51) Int. Cl.
*B60T 8/17* (2006.01)
*B60T 8/171* (2006.01)
(52) U.S. Cl.
USPC ................ 701/70; 701/29.1; 701/36
(58) Field of Classification Search
None
See application file for complete search history.

(56) References Cited

U.S. PATENT DOCUMENTS

| 6,017,102 | A | 1/2000 | Aga |
| 6,267,194 | B1 | 7/2001 | Bullinger et al. |
| 6,308,796 | B1 | 10/2001 | Fuchs et al. |
| 6,450,587 | B1 * | 9/2002 | MacGregor et al. ............ 303/89 |
| 6,517,172 | B1 * | 2/2003 | Bond et al. ..................... 303/193 |
| 6,523,912 | B1 * | 2/2003 | Bond et al. ......................... 303/9 |
| 7,213,687 | B2 * | 5/2007 | Sakai et al. .................. 188/4 R |
| 7,857,339 | B2 * | 12/2010 | Paulson ....................... 280/275 |
| 2004/0124697 | A1 * | 7/2004 | MacGregor et al. ............ 303/89 |
| 2005/0046272 | A1 * | 3/2005 | Rieth et al. ................. 303/113.4 |
| 2006/0197374 | A1 * | 9/2006 | Jez ................................. 303/20 |
| 2007/0068746 | A1 * | 3/2007 | Chittka ........................ 188/72.6 |
| 2008/0191546 | A1 * | 8/2008 | Plantamura et al. ............ 303/28 |

FOREIGN PATENT DOCUMENTS

| DE | 197 50 913 | A1 | | 5/1998 |
| DE | 197 49 296 | C1 | | 7/1999 |
| DE | 199 44 556 | A1 | | 3/2001 |
| DE | 102 20 566 | A1 | | 11/2003 |
| EP | 1 010 596 | A | | 6/2000 |
| FR | 2 840 866 | A | | 12/2003 |
| JP | 2005-22488 | A | * | 1/2005 |

* cited by examiner

*Primary Examiner* — Behrang Badii
*Assistant Examiner* — Demetra Smith-Stewart
(74) *Attorney, Agent, or Firm* — Kramer Levin Naftalis & Frankel LLP

(57) ABSTRACT

A driver assistance system for a motor vehicle includes at least one driving data sensor for sensing driving data that characterize the driving condition of the motor vehicle, and an electrical controller configured to initiate autonomous emergency braking of the motor vehicle when predetermined driving data has been sensed. A device is provided that is configured to detect a vehicle located in front of the motor vehicle in the direction of travel of the motor vehicle. The electrical controller maintains a brake of the motor vehicle in braking position or brings the brake into the braking position following an emergency braking action when a preceding vehicle is detected.

9 Claims, 1 Drawing Sheet

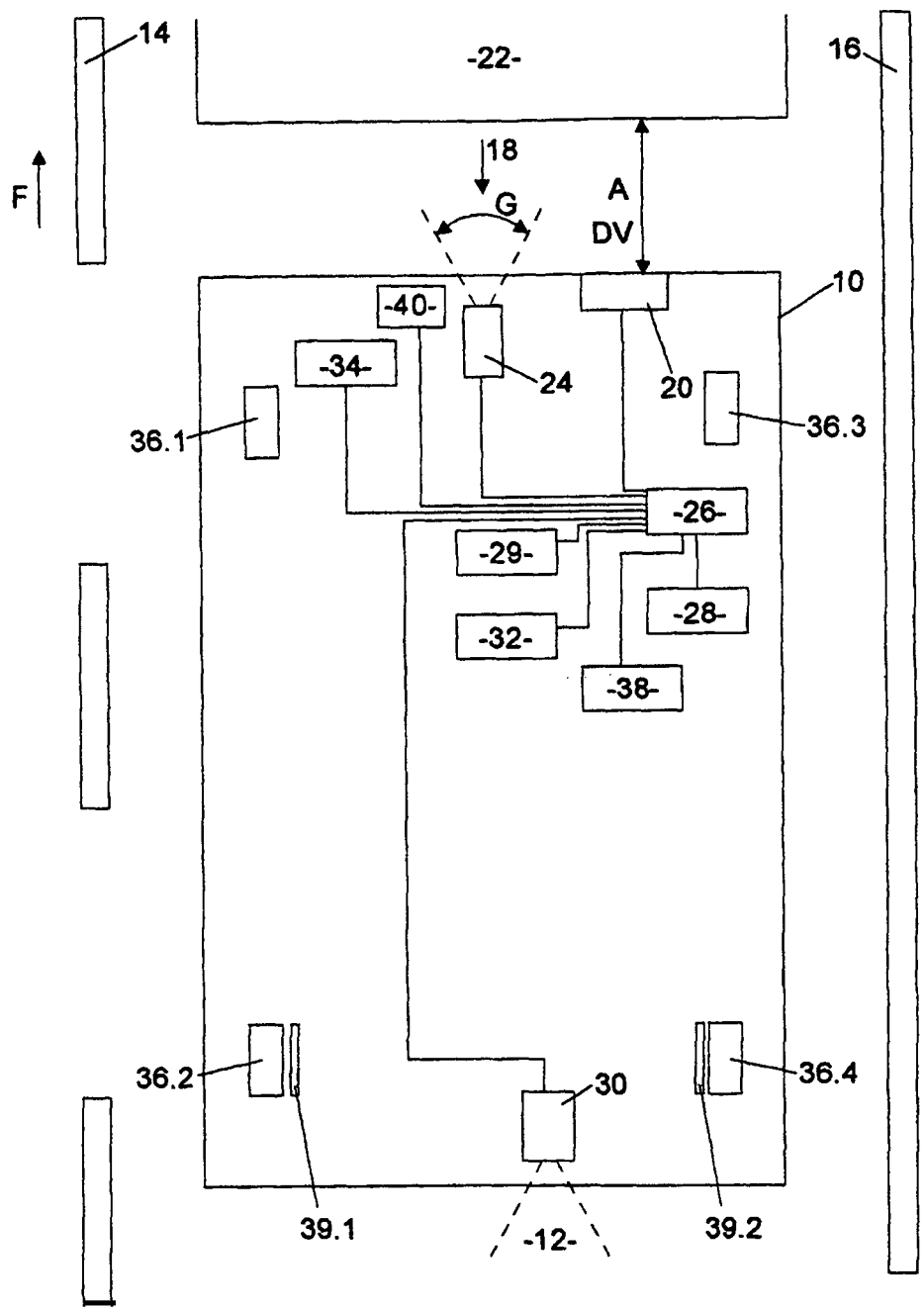

DRIVER ASSISTANCE SYSTEM FOR A MOTOR VEHICLE

FIELD OF THE INVENTION

The present invention generally relates to embodiments of a driver assistance system for and method of operating a motor vehicle having at least one driving data sensor for sensing driving data that characterize the driving state of the motor vehicle, and an electrical controller designed to initiate an autonomous emergency braking operation of the motor vehicle when predetermined driving data are present.

BACKGROUND OF THE INVENTION

Driver assistance systems of the general type under consideration that initiate an autonomous emergency braking operation when predetermined driving data are present are known, for example, by the term braking assistance system or ACC (Adaptive Cruise Control) system. Such driver assistance systems sense a multiplicity of driving data of the motor vehicle and determine, on the basis of an algorithm, whether there is a high probability of a situation being present in which there is a risk of an accident due to the fact that the driver of the motor vehicle is too hesitant or does not brake at all even though the driver ought to do so. As soon as the vehicle is stationary, conventional driver assistance systems end the intervention and assign the steering of the vehicle completely to the driver again.

A disadvantage with conventional driver assistance systems is that they are only capable of avoiding or alleviating the consequences of accidents that are due to driver error.

SUMMARY OF THE INVENTION

Generally speaking, it is an object of the present invention to overcome disadvantages associated with conventional driver assistance systems by means of a driver assistance system that includes and leverages a preceding vehicle detection device configured to detect a preceding vehicle located in front of the motor vehicle in a direction of travel of the motor vehicle, wherein the electrical controller is configured to hold a brake of the motor vehicle in a braking position or to move it into the braking position immediately after an emergency braking operation if the preceding vehicle detection device detects the preceding vehicle.

According to another aspect of the present invention, a method for operating a motor vehicle is provided, including the steps of: (i) sensing whether an emergency braking operation has been carried out immediately beforehand, (ii) if this is the case, sensing whether a preceding vehicle is located in front of the motor vehicle in a direction of travel of the motor vehicle, (iii) if this is the case, sensing whether the motor vehicle is stationary, and (iv) if this is the case, moving the brake into a brake position or holding it in the braking position.

It will be appreciated that an advantage of the present invention is that it is possible to avoid a situation in which a vehicle driving into the rear of a motor vehicle that is already stationary after an emergency braking operation causes the motor vehicle to collide with the preceding vehicle, and damages the preceding vehicle. In such a situation, damage to the front side of the motor vehicle is also prevented.

The ease of implementation of the inventive embodiments is also advantageous. For example it is sufficient to reprogram existing driver assistance systems in order to be able to carry out the inventive embodiments. It is also advantageous that even if the driver of the motor vehicle is injured or even unconscious owing to the accident, the motor vehicle is held securely in place insofar as is necessary in view of the fact that a preceding vehicle is located in front of the motor vehicle.

Within the scope of the present description, an emergency braking operation is understood in particular to be a braking maneuver in which a braking force above a predefined limiting value, in particular a maximum braking force, is applied. This braking force acts, in particular, on the service brakes of the motor vehicle until the vehicle has come to a standstill. Such an emergency braking operation may be autonomous or driver-controlled.

A preceding vehicle detection device is to be understood, in particular, as any device that is designed and provided for determining the presence of a vehicle in front of the motor vehicle in the direction of travel. This preceding vehicle detection device may be configured such that it only senses vehicles above a certain size as vehicles. Examples of preceding vehicle detection devices are distance sensors such as radar sensors or ultrasonic sensors or cameras such as, for example, a lane-keeping camera or a camera of an accident data recorder. A driving data sensor is understood, in particular, to be any device that outputs an electrical signal from which the state of movement of the motor vehicle can be derived. Examples of driving data sensors are acceleration sensors, yaw rate sensors, speed sensors, steering angle sensors or brake pedal position sensors. The preceding vehicle detection device outputs, for example at regular time intervals, a presence signal that encodes the possible presence of a preceding vehicle. Interruption in a non-presence signal, which otherwise occurs continuously, is also understood as equivalent to outputting the presence signal. The electrical controller should be capable of detecting whether a preceding vehicle is present. After an emergency braking operation, the electrical controller senses whether a preceding vehicle is present, and if this is the case it actuates a service brake or preferably a parking brake that securely parks the motor vehicle.

According to an embodiment of the present invention, the electrical controller is configured to move the brake, in particular the service brake and/or the parking brake, into a release position or to hold it in the release position after an emergency braking operation if a preceding vehicle is not detected. It is possible to provide that the release signal is not output if the brake pedal is actuated by the driver.

In another embodiment, the driver assistance system includes a speed sensor, wherein the electrical controller is configured to move a parking brake into the braking position if the motor vehicle starts to roll again under its own power after a stationary state owing to an emergency braking operation. This may occur, for example, if a vehicle drives into the motor vehicle from the rear, the motor vehicle is on a section of road with a negative gradient, or the engine unintentionally starts the motor vehicle moving by means of a viscous clutch. The electrical controller also preferably continuously senses inputs by the driver via an input device and carries out the actions described above only when there is no contradictory input by the driver.

Preferably, the electrical controller is configured to move the brake into the braking position or the release position or to hold the brake in the brake position or release position only after an autonomous emergency braking operation. In particular, the electrical controller is preferably configured such that it continuously stops the motor vehicle only after an autonomous emergency braking operation. However, it is alternatively also possible for the electrical controller to be configured such that after any emergency braking operation it moves the brake of the motor vehicle into the braking position or holds it there if an emergency braking operation has been carried out, whether autonomous or initiated by the driver.

The electrical controller is preferably configured to trigger an autonomous emergency braking operation of the motor vehicle by virtue of the fact that it transmits a corresponding braking signal to a service brake of the motor vehicle, wherein a parking brake is moved into the braking position after the emergency braking operation. Alternatively, the service brake of the motor vehicle can also be held in the braking position or moved into the braking position.

In order to prevent the driver assistance system from activating or deactivating the brakes contrary to the driver's wishes, according to one advantageous embodiment of the invention a deactivation device is provided for manually deactivating the driver assistance system.

Still other objects and advantages of the present invention will in part be obvious and will in part be apparent from the specification.

The present invention accordingly comprises the features of construction, combination of elements, arrangement of parts, and the various steps and the relation of one or more of such steps with respect to each of the others, all as exemplified in the constructions herein set forth, and the scope of the invention will be indicated in the claims.

BRIEF DESCRIPTION OF THE DRAWINGS

Hereinafter, an embodiment of the invention will be discussed in more detail with reference to the appended drawing, in which:

FIG. 1 shows a motor vehicle according to an embodiment of the present invention.

DETAILED DESCRIPTION OF THE PREFERRED EMBODIMENTS

FIG. 1 shows a motor vehicle 10 that when operating travels in a direction F on a roadway 12. The roadway 12 has a lane marking 14 on the left in the direction of travel, and a lane boundary marking 16 on the right in the direction of travel. A driving data sensor 20 in the form of a radar distance meter, which senses a distance A from a vehicle 22 traveling in front at time intervals of, for example, less than a second, that is quasi-continuously, is located on a front side 18 of the motor vehicle 10.

The motor vehicle 10 has, on the front side 18, a lane-keeping camera 24 the field of view G of which is configured such that the lane marking 14 and the lane boundary marking 16 can be sensed. Images taken by the lane-keeping camera 24 are transferred to an electrical controller 26 that is also in contact with the driving data sensor 20. On the basis of the driving data of the driving data sensor 20 and images of the lane-keeping camera 24, the electrical controller 26 determines continuously whether a driving situation of the motor vehicle 10 that requires autonomous partial braking or full braking is present.

In order to reconstruct any accident events, an accident data recorder 28 is provided into which data that are buffered by the electrical controller 26, in particular images of the lane-keeping camera 24, are written. The motor vehicle 10 also comprises a deceleration sensor 29, a reversing camera 30, a yaw rate sensor 32 and a steering angle sensor 34, which are all in contact with the electrical controller 26.

If the electrical controller 26 detects data that suggest the presence of an emergency braking situation owing to an internally occurring algorithm, the electrical controller 26 actuates the service brakes 36.1, 36.2, 36.3, 36.4, which brake the motor vehicle 10 with maximum deceleration. If a speed sensor 38 senses a speed that is so low that it can be considered to be zero, the electrical controller 26 compares the distance A with a predefined threshold value $A_{threshold}$. If this threshold value $A_{threshold}$ is undershot, this is a sign that a vehicle 22 traveling in front is located just in front of the motor vehicle 10. The threshold value $A_{threshold}$ may be, for example, 3 m.

If the distance A drops below the threshold value $A_{threshold}$, the electrical controller 26 sends a signal to the service brakes, after which the service brakes remain in the braking position. This is equivalent to a situation in which the electrical controller 26 does not transmit a signal to the service brakes, which moves them actively into the release position. Alternatively, the electrical controller 26 sends a signal to parking brakes 39.1, 39.2, which subsequently go into a braking position and securely park the motor vehicle 10. If a further vehicle approaches the motor vehicle 10 from behind, there is therefore no rear-end collision with the preceding vehicle 22.

If the distance A is larger than the threshold value $A_{threshold}$, the electrical controller 26 transmits a signal, with the result that the service brakes are moved into a release position. If the service brakes are, for example, pneumatic brakes, compressed air is applied to them in such a way that they no longer brake the vehicle. Alternatively, parking brakes 39.1, 39.2, which are actuated in any way are moved into a release position.

A deactivation device 40 can be provided that, when activated, causes the electrical controller 26 to activate the service brakes only to the extent that such activation still corresponds to a position of a brake pedal (not indicated), and the parking brakes to be moved into a position that corresponds to the activation position of an activation switch that can be activated by the driver.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A driver assistance system for a motor vehicle, comprising:
    at least one driving data sensor for sensing driving data indicative of the driving state of the motor vehicle;
    an electrical controller configured to initiate an autonomous emergency braking operation of the motor vehicle when predetermined driving data for triggering braking are present; and
    a preceding vehicle detection device configured to detect a preceding vehicle located in front of the motor vehicle in a direction of travel of the motor vehicle;
    wherein the electrical controller is further configured to at least one of hold a brake of the motor vehicle in a braking position and move the brake of the motor vehicle into the braking position when the motor vehicle is substantially at a standstill after the emergency braking operation and when the preceding vehicle detection device detects the preceding vehicle.

2. The driver assistance system as claimed in claim 1, wherein the electrical controller is configured to move the brake into a release position after the emergency braking operation when the preceding vehicle detection device does not detect a preceding vehicle.

3. The driver assistance system as claimed in claim 1, further comprising a deactivation device for manually deactivating the driver assistance system.

4. A motor vehicle, comprising the driver assistance system as claimed in claim 1.

5. A driver assistance system for a motor vehicle, comprising:
- at least one driving data sensor for sensing driving data indicative of the driving state of the motor vehicle;
- an electrical controller configured to initiate an autonomous emergency braking operation of the motor vehicle when predetermined driving data for triggering braking are present; and
- a preceding vehicle detection device configured to detect a preceding vehicle located in front of the motor vehicle in a direction of travel of the motor vehicle;
- wherein the electrical controller is configured to at least one of hold a brake of the motor vehicle in a braking position and move the brake of the motor vehicle into the braking position after the emergency braking operation when the preceding vehicle detection device detects the preceding vehicle, and wherein the electrical controller is configured to move the brake into the braking position when the motor vehicle begins to move after a stationary state resulting from the emergency braking operation.

6. A driver assistance system for a motor vehicle, comprising:
- at least one driving data sensor for sensing driving data indicative of the driving state of the motor vehicle;
- an electrical controller configured to initiate an autonomous emergency braking operation of the motor vehicle when predetermined driving data for triggering braking are present; and
- a preceding vehicle detection device configured to detect a preceding vehicle located in front of the motor vehicle in a direction of travel of the motor vehicle;
- wherein the electrical controller is configured to at least one of hold a service brake of the motor vehicle in a braking position and move the service brake of the motor vehicle into the braking position after the emergency braking operation when the preceding vehicle detection device detects the preceding vehicle, and wherein the electrical controller is configured to:
  - trigger the autonomous emergency braking operation of the motor vehicle by transmitting a corresponding emergency braking signal to the service brake of the motor vehicle; and
  - move a parking brake of the motor vehicle into the braking position after the emergency braking operation.

7. A method for operating a motor vehicle, comprising the steps of:
- sensing whether an emergency braking operation has been carried out;
- when the motor vehicle is substantially at a standstill after an emergency braking operation has been carried out, sensing whether a preceding vehicle is located in front of the motor vehicle in a direction of travel of the motor vehicle;
- sensing whether the motor vehicle is stationary; and
- one of moving a brake of the motor vehicle into a braking position and holding the brake in the braking position.

8. The method as claimed claim 7, further comprising the step of moving a parking brake of the motor vehicle into the braking position.

9. The method as claimed in claim 8, further comprising the steps of determining whether a deactivation device has been activated, and when the deactivation device has been activated, releasing the parking brake.

\* \* \* \* \*

UNITED STATES PATENT AND TRADEMARK OFFICE
CERTIFICATE OF CORRECTION

PATENT NO.       : 8,655,564 B2                                      Page 1 of 1
APPLICATION NO.  : 12/734064
DATED            : February 18, 2014
INVENTOR(S)      : Breuer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this
Twenty-ninth Day of September, 2015

Michelle K. Lee
*Director of the United States Patent and Trademark Office*